(12) United States Patent
Bryan

(10) Patent No.: US 12,705,845 B2
(45) Date of Patent: Aug. 11, 2026

(54) PROVIDING AUGMENTED REALITY VIEW BASED ON GEOGRAPHICAL DATA

(71) Applicant: Google LLC, Mountain View, CA (US)

(72) Inventor: Kathleen Alexandra Bryan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 143 days.

(21) Appl. No.: 18/850,980

(22) PCT Filed: Feb. 6, 2023

(86) PCT No.: PCT/US2023/012403
§ 371 (c)(1),
(2) Date: Sep. 25, 2024

(87) PCT Pub. No.: WO2024/167482
PCT Pub. Date: Aug. 15, 2024

(65) Prior Publication Data
US 2025/0218134 A1 Jul. 3, 2025

(51) Int. Cl.
*G06T 19/00* (2011.01)

(52) U.S. Cl.
CPC .................................. *G06T 19/006* (2013.01)

(58) Field of Classification Search
CPC ..... G06T 19/006; G06T 19/00; G06T 19/003; G06T 19/20; G06T 17/00; G06T 17/05; G06T 17/205; G06T 15/00; G06T 15/005; G06T 15/06; G06T 15/205
See application file for complete search history.

(56) References Cited

U.S. PATENT DOCUMENTS 9,761,057 B2 * 9/2017 Salter .................... G06T 19/006
10,726,597 B1 * 7/2020 Chang ................. G06V 10/235
11,900,547 B2 * 2/2024 Gomez Gonzalez ........................ G06F 16/338
12,350,586 B2 * 7/2025 Hariton ................ A63F 13/216
(Continued)

OTHER PUBLICATIONS

Anonymous: What Is Augmented Reality? (+Most Common Types of AR Used Today), [retrieved on Jul. 18, 2023]. Retrieved from the Internet: URL:https%3A%2F%2Fweb.archive.org%2Fweb%2F20211116062142%2Fhttps%3A%2F%2Fwww.g2.com%2Farticles%2Faugmented-reality.
(Continued)

*Primary Examiner* — Vijay Shankar
(74) *Attorney, Agent, or Firm* — DORITY & MANNING, P.A.

(57) ABSTRACT

A method for providing an augmented reality view includes obtaining, based on a location of a computing device, a three-dimensional (3D) reconstruction of a scene associated with the location, the 3D reconstruction of the scene including one or more objects, processing the 3D reconstruction of the scene by generating one or more virtual objects which respectively correspond to the one or more objects, each virtual object being in a form of a virtual outline of a corresponding object among the one or more objects and, providing, for presentation on a display device of the computing device, an augmented reality view of the scene by overlaying at least one virtual outline onto a corresponding real-world object presented on the display device such that the at least one virtual outline at least partially frames the corresponding real-world object.

15 Claims, 7 Drawing Sheets

(56) References Cited

U.S. PATENT DOCUMENTS

2020/0098189 A1* 3/2020 Pavloff ................. G06T 19/006
2026/0087723 A1* 3/2026 Jung ....................... G06T 15/04
2026/0087760 A1* 3/2026 Guler ........................ G06T 3/18

OTHER PUBLICATIONS

Arth et al., "Instant Outdoor Localization and SLAM Initialization from 2.5D Maps", IEEE Transactions on Visualization and Computer Graphics, vol. 21, No. 11, Nov. 2015, pp. 1309-1318.
International Search Report for PCT/US2023/012403, mailed on Jul. 28, 2023, 2 pages.
Nextech: What Are The Different Types of Augmented Reality?, [retrieved on Jul. 18, 2023]. Retrieved from the Internet: URL:https%3A%2F%2Fweb.archive.org%2Fweb%2F20220707050750%2Fhttps%3A%2F%2Fwww.nextechar.com%2Fblog%2Fwhat-are-the-different-types-of-augmented-reality.
Reitmayr et al., "Going out: Robust model-based tracking for outdoor augmented reality", Fifth IEEE/ACM International Symposium on Mixed and Augmented Reality, Oct. 22-25, 2006, Santa Barbara, CA.
International Preliminary Report on Patentability for Application No. PCT/US2023/012403, mailed Aug. 21, 2025, 7 pages.

* cited by examiner

PROVIDING AUGMENTED REALITY VIEW BASED ON GEOGRAPHICAL DATA

PRIORITY CLAIM

This application is based upon and claims the right of priority under 35 U.S.C. § 371 to International Application No. PCT/US2023/012403 filed on Feb. 6, 2023, which is incorporated by reference herein in its entirety for all purposes.

FIELD

The disclosure relates generally to providing an augmented reality view of a location based on geographical data related to objects (e.g., buildings) at the location. For example, the disclosure relates to methods and systems for providing an augmented reality view of a location by obtaining geographical data associated with an object at the location, constructing a three-dimensional model of a scene including the object based on the geographical data, and providing for presentation at least part of the three-dimensional model as a virtual object (e.g., in the form of an outline of an object) for an augmented reality view on a display device of a computing device.

BACKGROUND

Augmented reality display devices are capable of simultaneously presenting real-world content and computer-generated content. Some augmented reality devices combine low light and thermal images with an augmented reality overlay in real-time, for example, to provide an outline of a person within a field of view of the augmented reality device. The outline may be created through real-time edge detection, for example.

SUMMARY

Aspects and advantages of embodiments of the disclosure will be set forth in part in the following description, or can be learned from the description, or can be learned through practice of the example embodiments.

In one or more example embodiments, a computer implemented method for providing an augmented reality view of a location is provided. For example, the method includes obtaining, based on a location of a computing device, a three-dimensional (3D) reconstruction of a scene associated with the location, the 3D reconstruction of the scene including one or more objects; processing the 3D reconstruction of the scene by generating one or more virtual objects which respectively correspond to the one or more objects, each virtual object being in a form of a virtual outline of a corresponding object among the one or more objects; and providing, for presentation on a display device of the computing device, an augmented reality view of the scene by overlaying at least one virtual outline onto a corresponding real-world object presented on the display device such that the at least one virtual outline at least partially frames the corresponding real-world object.

In some implementations, processing the 3D reconstruction of the scene by generating the one or more virtual objects comprises utilizing a shader to illuminate each of the one or more virtual objects.

In some implementations, the method includes requesting, from a server computing system, geographic data associated with the location of the computing device, wherein the geographic data includes geographic data about real-world objects in a surrounding environment of the computing device; and generating the 3D reconstruction of the scene based on the geographic data.

In some implementations, generating the 3D reconstruction of the scene comprises mapping geographic data for one or more real-world objects among the real-world objects in the surrounding environment to corresponding virtual objects.

In some implementations, the geographic data includes latitude and longitude information for each real-world object.

In some implementations, processing the 3D reconstruction of the scene by generating the one or more virtual objects which respectively correspond to the one or more objects comprises forming the virtual outline for each object among the one or more objects in the 3D reconstruction of the scene by identifying at least one of: one or more edges of each object, one or more vertices of each object, or one or more contours of each object.

In some implementations, the method includes sensing ambient light in a surrounding environment of the computing device, wherein obtaining, based on the location of the computing device, the 3D reconstruction of the scene associated with the location, is in response to the ambient light sensed in the surrounding environment of the computing device being less than a threshold level.

In some implementations, the one or more objects from the scene are disposed within a predetermined distance from the location of the computing device.

In some implementations, the predetermined distance is adjustable by a user of the computing device.

In some implementations, the predetermined distance from the location of the computing device is outside a field of view of the computing device.

In some implementations, the one or more objects correspond to one or more buildings, each the one or more virtual objects are in the form of the virtual outline of a corresponding building among the one or more buildings, and at least one virtual outline at least partially frames a corresponding real-world building when presented on the display device.

In one or more example embodiments, a computing device (e.g., a laptop, table, smartphone, augmented reality glasses, head-up display, contact lenses, goggles, etc.) is provided. The computing device may include a display device; at least one memory to store instructions; and at least one processor configured to execute the instructions to: obtain, based on a location of the computing device, a three-dimensional (3D) reconstruction of a scene associated with the location, the 3D reconstruction of the scene including one or more objects, process the 3D reconstruction of the scene by generating one or more virtual objects which respectively correspond to the one or more objects, each virtual object being in a form of a virtual outline of a corresponding object among the one or more objects, and provide, for presentation on the display device of the computing device, an augmented reality view of the scene by overlaying at least one virtual outline onto a corresponding real-world object presented on the display device such that the at least one virtual outline at least partially frames the corresponding real-world object.

In some implementations, the at least one processor is configured to process the 3D reconstruction of the scene by utilizing a shader to illuminate each of the one or more virtual objects.

In some implementations, the at least one processor is configured to execute the instructions to: request, from a server computing system, geographic data associated with the location of the computing device, wherein the geographic data includes latitude and longitude information about real-world objects in a surrounding environment of the computing device, generate the 3D reconstruction of the scene based on the geographic data, and form the virtual outline for each object among the one or more objects in the 3D reconstruction of the scene by identifying at least one of: one or more edges of each object, one or more vertices of each object, or one or more contours of each object.

In some implementations, the at least one processor is configured to generate the 3D reconstruction of the scene by mapping geographic data for one or more real-world objects among the real-world objects in the surrounding environment to corresponding virtual objects.

In some implementations, the computing device further includes an ambient light sensor configured to sense ambient light in a surrounding environment of the computing device, wherein the at least one processor is configured to execute the instructions to obtain, based on the location of the computing device, the 3D reconstruction of the scene associated with the location, in response to the ambient light sensed by the ambient light sensor being less than a threshold level.

In some implementations, the one or more objects from the scene are disposed within a predetermined distance from the location of the computing device, and the predetermined distance is adjustable by a user of the computing device to be outside a field of view of the computing device.

In one or more example embodiments, a server system (e.g., a server) is provided. The server system may include at least one memory to store instructions; and at least one processor configured to execute the instructions to obtain, based on a location of a computing device, a three-dimensional (3D) reconstruction of a scene associated with the location, the 3D reconstruction of the scene including one or more objects; process the 3D reconstruction of the scene by generating one or more virtual objects which respectively correspond to the one or more objects, each virtual object being in a form of a virtual outline of a corresponding object among the one or more objects; and provide, for presentation on a display device of the computing device, an augmented reality view of the scene by overlaying at least one virtual outline onto a corresponding real-world object presented on the display device such that the at least one virtual outline at least partially frames the corresponding real-world object.

In one or more example embodiments, a computer program is provided. The computer program, when run on at least one processor, causes the at least one processor to perform one or more operations which are associated with any of the methods described herein (e.g., operations of the server computing system and/or operations of the computing device).

In one or more example embodiments, a computer-readable medium (e.g., a non-transitory computer-readable medium) which stores instructions that are executable by one or more processors of a computing system is provided. In some implementations the computer-readable medium stores instructions which may include instructions to cause the one or more processors to perform one or more operations which are associated with any of the methods described herein (e.g., operations of the server computing system and/or operations of the computing device). The computer-readable medium may store additional instructions to execute other aspects of the server computing system and computing device and corresponding methods of operation, as described herein.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which.

DETAILED DESCRIPTION

Figure 1:
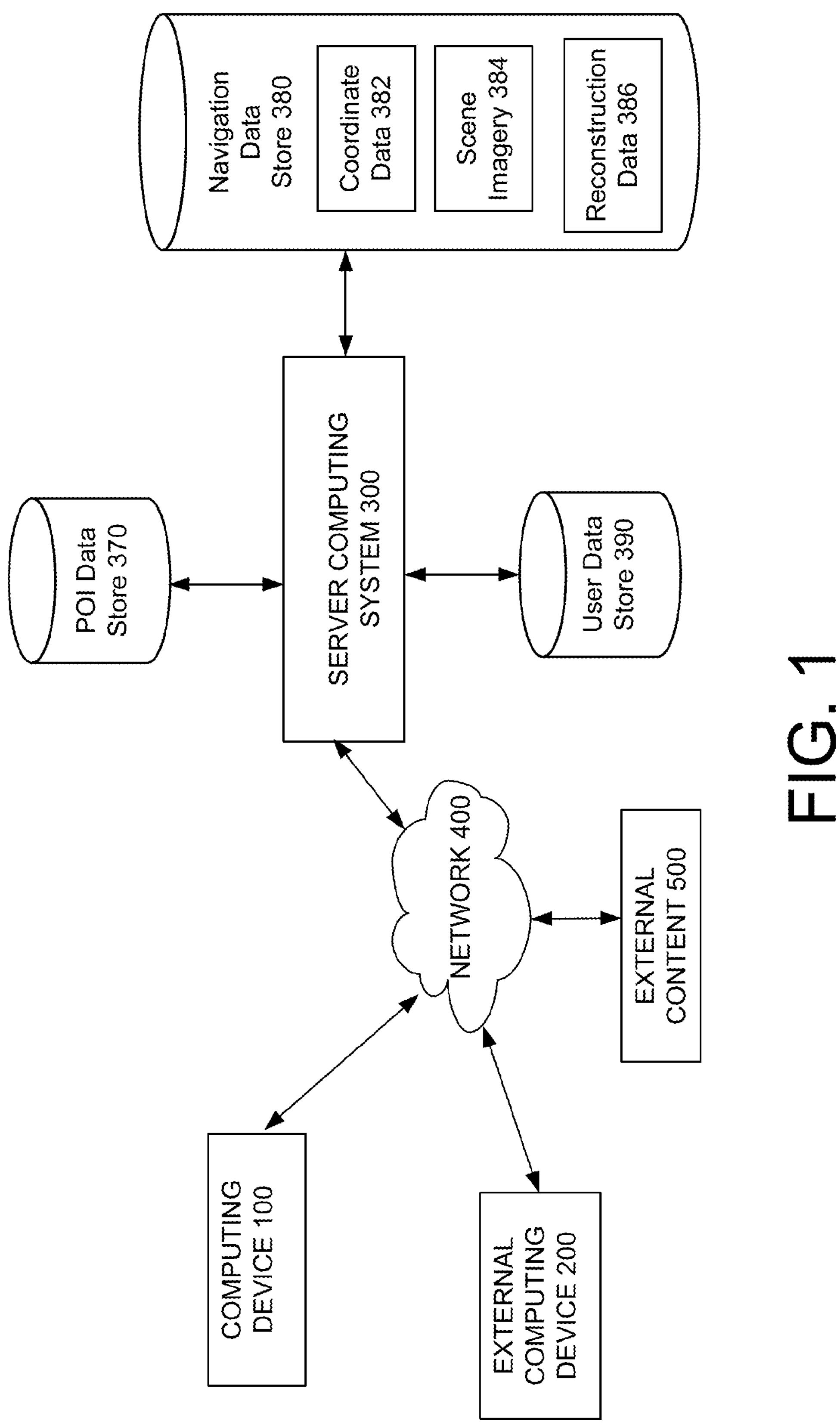
FIG. 1 depicts an example system according to according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Examples of the disclosure are directed to a computer-implemented method for providing an augmented reality view of a location to represent a state of the location or provide information about the location to a user of a computing device. For example, according to examples of the disclosure the augmented reality view includes virtual outlines of objects from a scene that are overlaid on corresponding real-world objects which are presented on a display device. The virtual outlines of the objects may aid a user of the computing device by improving visibility or awareness of the environment and surroundings of the user. For example, a building may not be visible to a user at nighttime due to darkness. However, by presenting a virtual outline of the building in the augmented reality view a user can be made aware of the presence and/or shape of the building even though the building may not be visible to the user via the naked eye or via a camera of the computing device. Therefore, the user's safety and ability to navigate the surrounding environment may be improved. For example, the virtual outlines may be generated based on geographic data associated with objects at the location, rather than generating virtual lines through image processing techniques such as edge detection. For example, virtual outlines may be generated for objects which are not within a field of view of the camera of the computing device. Therefore, a range for generating and presenting virtual outlines with respect to objects associated with a location may be increased compared to previous methods which rely on edge detection.

According to example embodiments a method for providing an augmented reality view includes obtaining, based on a location of the computing device, a three-dimensional (3D) reconstruction of a scene associated with the location. In some implementations, the computing device can transmit its location to the server computing system. The server computing system can, in response to receiving the location, obtain geographic coordinate data associated with the location and obtain the 3D reconstruction of the scene associated with the location based on the geographic coordinate data. In some implementations, the computing device can request geographic coordinate data for a particular location without specifying that the location is the location of the computing device. The server computing system can, in response to receiving the location, provide the geographic coordinate data associated with the location to the computing device and the computing device can obtain the 3D reconstruction of the scene associated with the location based on the geographic coordinate data. In some implementations, the computing device can request geographic coordinate data for a particular location without specifying that the location is the location of the computing device. The server computing system can, in response to receiving the location, obtain the geographic coordinate data associated with the location and the server computing system can obtain the 3D reconstruction of the scene associated with the location based on the geographic coordinate data and provide the 3D reconstruction of the scene to the computing device. For example, the 3D reconstruction of the scene may include one or more objects. For example, the object may include buildings, sidewalks, roads, and the like.

The method for providing the augmented reality view may further include processing the 3D reconstruction of the scene by generating one or more virtual objects which respectively correspond to the one or more objects, each virtual object being in a form of a virtual outline of a corresponding object among the one or more objects. For example, the 3D reconstruction of the scene may be in a mesh form. For example, virtual outlines of the objects from the scene may be obtained from the geographic data associated with the objects (e.g., using information about vertices, coordinates along edges of the objects, etc.).

The method for providing the augmented reality view may further include providing, for presentation on a display device of the computing device, an augmented reality view of the scene by overlaying at least one virtual outline onto a corresponding real-world object presented on the display device such that the at least one virtual outline at least partially frames the corresponding real-world object. As mentioned above, in some implementations the corresponding real-world object may not be visible to the naked eye of a user of the computing device and/or may not be visible using a camera or other sensor device of the computing device.

According to example embodiments the computing device may include an augmented reality system having an augmented reality (AR) application to provide a user of a computing device an augmented reality view via a display device of the computing device. The AR application may be part of a navigation application or a separate mapping application, or may be a standalone application. The AR view may include an integrated scene of a location in which real-world objects are presented on the display device and virtual objects are simultaneously presented on the display device (e.g., in an overlaid manner). In some implementations, the virtual objects may include text, symbols, or other descriptive items which provide information about the scene to a user of the computing device. In some implementations, the virtual objects may include virtual outlines as described herein.

According to examples of the disclosure, a server computing system may include an augmented reality system having an augmented reality (AR) application to provide a user of a computing device an augmented reality view via a display device of the computing device. The AR application may be part of a navigation application or a separate mapping application, or may be a standalone application. The AR view to be provided to the computing device may include an integrated scene of a location in which real-world objects are presented on the display device and virtual objects are simultaneously presented on the display device (e.g., in an overlaid manner). In some implementations, the virtual objects may include text, symbols, or other descriptive items which provide information about the scene to a user of the computing device. In some implementations, the virtual objects may include virtual outlines as described herein.

In some implementations, a shader may be utilized to apply a visual effect to the virtual outlines to further enhance visibility of the virtual outlines. For example, the shader may illuminate the virtual outlines so as to be more distinct from the real-world objects presented on the display device.

In some implementations, the virtual outlines are overlaid on corresponding real-world objects presented on the display device in the AR view. For example, to generate a 3D reconstruction of a scene, geographic data for one or more real-world objects in a surrounding environment of the computing device may be mapped to corresponding virtual objects (e.g., virtual outlines). For example, each virtual outline may have associated geographic coordinate data or information that can be used for overlaying the virtual outline in a real-world scene that is presented on the AR view and the virtual outline can be overlaid on the corresponding real-world object. The overlaying of the virtual outline can be performed based on the known location of the computing device and orientation of the display device, for example.

In some implementations, the computing device can request, from the server computing system, geographic data associated with the location of the computing device, wherein the geographic data includes geographic data about real-world objects in a surrounding environment of the computing device. Here, the surrounding environment which includes the objects for which virtual outlines are to be generated can be specified by a predetermined radius from the computing device, a predetermined distance from the computing device (e.g., in a particular direction such as a traveling direction of the computing device), a default distance, and the like. The distance may be adjustable by a user of the computing device. The distance from the location of the computing device may be outside a field of view of the computing device, for example. The geographic data may include latitude and longitude information for each real-world object. The geographic data may include height or elevation information for each real-world object.

In some implementations, processing the 3D reconstruction of the scene by generating the one or more virtual objects which respectively correspond to the one or more objects may include forming the virtual outline for each object among the one or more objects in the 3D reconstruction of the scene by identifying at least one of one or more edges of each object, one or more vertices of each object, and/or one or more contours of each object. For example, the one or more edges of each object, one or more vertices of each object, and/or one or more contours of each object may be identified based on geographic coordinate data associated with each of the objects. For example, geographic coordinate data may be stored for various points along an edge of an object, for one or more vertices of the object, etc.

In some implementations, the AR view by which virtual outlines of objects are presented in an overlaid manner over corresponding real-world objects may be performed selectively. For example, an ambient light sensor may be configured to sense ambient light in a surrounding environment of the computing device. For example, one or more aspects of the method described herein may be performed in response to the ambient light sensed by the ambient light sensor being less than a threshold ambient light level. For example, the 3D reconstruction of the scene associated with the location may be obtained in response to the ambient light sensed by the ambient light sensor being less than the threshold ambient light level. For example, one or more aspects of the method described herein may be performed in response to a visibility being less than a threshold visibility distance (e.g., visibility being less than a specified distance such as 10 meters, 5 meters, etc.). For example, the 3D reconstruction of the scene associated with the location may be obtained in response to the visibility being less than a threshold visibility distance. For example, one or more aspects of the method described herein may be implemented at a specified time of day (e.g., sunset).

One or more technical benefits of the disclosure include allowing users to easily and more accurately obtain an accurate representation of a state of a location under particular circumstances or conditions. For example, a user can easily and more accurately obtain an accurate representation of a state of location under low visibility or low-light conditions where the user may not be able to see a building or other structure or object (e.g., along a navigation route). including a restaurant or park at a particular time of day, time of day, time of year, etc. Due to the methods described herein, users are provided with an accurate representation or view of a state of a location, virtually and via a display, without regard to whether objects are within a field of view of a camera.

One or more technical benefits of the disclosure also include selectively specifying an area for which virtual outlines of objects associated with a location are to be generated. For example, virtual outlines of objects a specified distance from the computing device in a particular direction may be provided rather than virtual outlines of objects within a specified radius of the computing device. Likewise, one or more technical benefits of the disclosure also include selectively specifying types of objects for which virtual outlines of objects associated with a location are to be generated. For example, virtual outlines of specific objects (e.g., buildings) may be provided rather than virtual outlines of all objects associated with the location. Therefore, computing resources including memory, network usage, processing power, etc., may be conserved.

Thus, according to aspects of the disclosure, technical benefits such as resource savings, improved safety, enhanced viewing capability, and the like may be achieved.

Referring now to the drawings, FIG. 1 is an example system according to one or more example embodiments of the disclosure. FIG. 1 illustrates an example of a system which includes a computing device 100, an external computing device 200, a server computing system 300, and external content 500, which may be in communication with one another over a network 400. For example, the computing device 100 and the external computing device 200 can include any computing device configured to provide an augmented reality view, and may include a personal computer (laptop), a smartphone, a tablet computer, a global positioning service device, augmented reality glasses or goggles, and the like. The network 400 may include any type of communications network including a wired or wireless network, or a combination thereof. The network 400 may include a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

As will be explained in more detail below, in some implementations the computing device 100 and/or server computing system 300 may form part of a navigation and mapping system and/or an augmented reality system which can provide an augmented reality view of a location to a user of the computing device 100.

In some example embodiments, the server computing system 300 may obtain data from one or more of a POI data store 370, a navigation data store 380, and a user data store 390, to implement various operations and aspects of the navigation and mapping system as disclosed herein. The POI data store 370, navigation data store 380, and user data store 390 may be integrally provided with the server computing system 300 (e.g., as part of the one or more memory devices 320 of the server computing system 300) or may be separately (e.g., remotely) provided. Further, POI data store 370, navigation data store 380, and user data store 390 can be combined as a single data store (database), or may be a plurality of respective data stores. Data stored in one data store (e.g., the POI data store 370) may overlap with some data stored in another data store (e.g., the navigation data store 380). In some implementations, one data store (e.g., the POI data store 370) may reference data that is stored in another data store (e.g., the navigation data store 380).

POI data store 370 can store information about locations or points-of-interest, for example, for points-of-interest in an area or region associated with one or more geographic areas. A point-of-interest may include any destination or place. For example, a point-of-interest may include a restaurant, museum, sporting venue, concert hall, amusement park, school, place of business, grocery store, gas station, theater, shopping mall, lodging, and the like. Point-of-interest data which is stored in the POI data store 370 may include any information which is associated with the POI. For example, the POI data store 370 may include location information for the POI including geographical coordinate information about the POI (e.g., two-dimensional coordinate data and/or three-dimensional coordinate data). For example, the POI data store 370 may include information concerning the hours of operation for the POI, a phone number for the POI, reviews concerning the POI, financial information associated with the POI (e.g., the average cost for a service provided and/or goods sold at the POI such as a meal, a ticket, a room, etc.), environmental information concerning the POI (e.g., a noise level, an ambiance description, a traffic level, etc., which may be provided or available in real-time by various sensors located at the POI), a description of the types of services provided and/or goods sold, languages spoken at the POI, a URL for the POI, image content associated with the POI, etc. For example, information about the POI may be obtainable from external content 500 (e.g., from webpages associated with the POI or from sensors disposed at the POI).

Navigation data store 380 may store or provide map data/geospatial data to be used by server computing system 300. Example geospatial data includes geographic imagery (e.g., digital maps, satellite images, aerial photographs, street-level photographs, synthetic models, etc.), tables, vector data (e.g., vector representations of roads, parcels, buildings, etc.), point of interest data, or other suitable geospatial data associated with one or more geographic areas. In some examples, the map data can include a series of sub-maps, each sub-map including data for a geographic area including objects (e.g., buildings or other static features), paths of travel (e.g., roads, highways, public transportation lines, walking paths, and so on), and other features of interest. Navigation data store 380 can be used by server computing system 300 to provide navigational directions, perform point of interest searches, provide point of interest location or categorization data, determine distances, routes, or travel times between locations, or any other suitable use or task required or beneficial for performing operations of the example embodiments as disclosed herein. For example, the navigation data store 380 may include coordinate data 382 for POIs (buildings, landmarks, etc.), roads or other travelling thoroughfares or transit routes and paths, sidewalks, parking lots, and the like (e.g., two-dimensional coordinate data and/or three-dimensional coordinate data).

For example, the navigation data store 380 may store 2D and/or 3D scene imagery 384 which includes images of objects that may have corresponding geographical coordinate data associated therewith. For example, geographical coordinate data may be mapped to an image of a building to provide three-dimensional information about the building (e.g., height, depth, and length information). The geographical coordinate data associated with the object may be used to generate two-dimensional and/or three-dimensional reconstructions of the object (e.g., a building, landmark, road, sidewalk, etc.) which may be stored as reconstruction data 386. For example, the reconstruction may be generated and include edge or contour information about the building or other object so that an outline of the building or other object can be generated (rendered). In an example, an augmented reality (AR) scene generator 144 and/or AR scene generator 344 may be configured to generate an AR scene based on a reconstruction of the object (e.g., a building) that is obtained from geographical coordinates associated with the object. For example, a plurality of images stored in scene imagery 384 may be captured and combined using known methods to create a 3D scene of a location. For example, images which overlap with one another may be stitched together to create a 3D model of the scene. In some implementations, a method including a structure from motion algorithm can be used to estimate a three-dimensional structure.

For example, the navigation data store 380 may store scene imagery 384 which includes 3D scenes of various locations. A 3D scene may be formed by an outline of various objects within the scene and may be provided to server computing system 300 and/or computing device 100 based on a location associated with the computing device 100. For example, the 3D scene may be provided to computing device 100 and included in an augmented reality view to be presented on the display device 170 during execution of AR application 142.

As an example, a person may view a street at night in which it is difficult to see using augmented reality glasses (i.e., a computing device 100). Based on the location of the user (which may be determined using the location of the augmented reality glasses in an example), a reconstruction of a 3D model of one or more objects at the location (e.g., buildings, sidewalks, streets, etc.) may be generated based on geographical coordinate data stored at navigation data store 380 (e.g., coordinate data 382) which is associated with each of the objects. In some implementations, the 3D model may be generated in real-time. In some implementations, the 3D model may have been pre-generated and stored as reconstruction data 386 and the 3D model may be retrieved based on the location of the computing device 100. As another operation, an outline of the one or more objects from the 3D model may be generated or rendered and presented on the display device 170 during execution of the AR application 142, for example, by overlaying the respective outlines for each object in the scene as viewed through the AR glasses (e.g., in a one-to-one manner). The outline of the one or more objects in the scene presented on the AR glasses enables the user to better understand their surroundings.

In some example embodiments, the user data store 390 can represent a single database. In some embodiments, the user data store 390 represents a plurality of different databases accessible to the server computing system 300. In some examples, the user data store 390 can include a current user position and heading data. In some examples, the user data store 390 can include information regarding one or more user profiles, including a variety of user data such as user preference data, user demographic data, user calendar data, user social network data, user historical travel data, and the like. For example, the user data store 390 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; scheduling data; location data; SMS data; or other suitable data associated with a user account. According to one or more examples of the disclosure, the data can be analyzed to determine preferences of the user with respect to providing an augmented reality view according to the examples disclosed herein, for example, to automatically suggest or automatically provide an augmented reality view according to the examples disclosed herein. In some implementations, the augmented reality view according to the examples disclosed herein may be provided at a particular time of day according to a user preference. The data can also be analyzed to determine preferences of the user with respect to a POI, for example, to determine preferences of the user with respect to traveling (e.g., a mode of transportation, an allowable time for traveling, etc.), to determine possible recommendations for POIs for the user, to determine possible travel routes and modes of transportation for the user to a POI, and the like.

The user data store 390 is provided to illustrate potential data that could be analyzed, in some embodiments, by the server computing system 300 to identify user preferences, to recommend POIs, to determine possible travel routes to a POI, to determine modes of transportation to be used to travel to a POI, to determine augmented reality views of locations to provide to a computing device associated with the user, etc. However, such user data may not be collected, used, or analyzed unless the user has consented after being informed of what data is collected and how such data is used. Further, in some embodiments, the user can be provided with a tool (e.g., in a navigation application or via a user account) to revoke or modify the scope of permissions. In addition, certain information or data can be treated in one or more ways before it is stored or used, so that personally identifiable information is removed or stored in an encrypted fashion. Thus, particular user information stored in the user data store 390 may or may not be accessible to the server computing system 300 based on permissions given by the user, or such data may not be stored in the user data store 390 at all. As another example, a user may enable or disable location sharing information which may be used to provide the augmented reality view as described herein.

External content 500 can be any form of external content including news articles, webpages, video files, audio files, written descriptions, ratings, game content, social media content, photographs, commercial offers, transportation method, weather conditions, sensor data obtained by various sensors, or other suitable external content. The computing device 100, external computing device 200, and server computing system 300 can access external content 500 over network 400. External content 500 can be searched by computing device 100, external computing device 200, and server computing system 300 according to known searching methods and search results can be ranked according to relevance, popularity, or other suitable attributes, including location-specific filtering or promotion.

Figure 2:
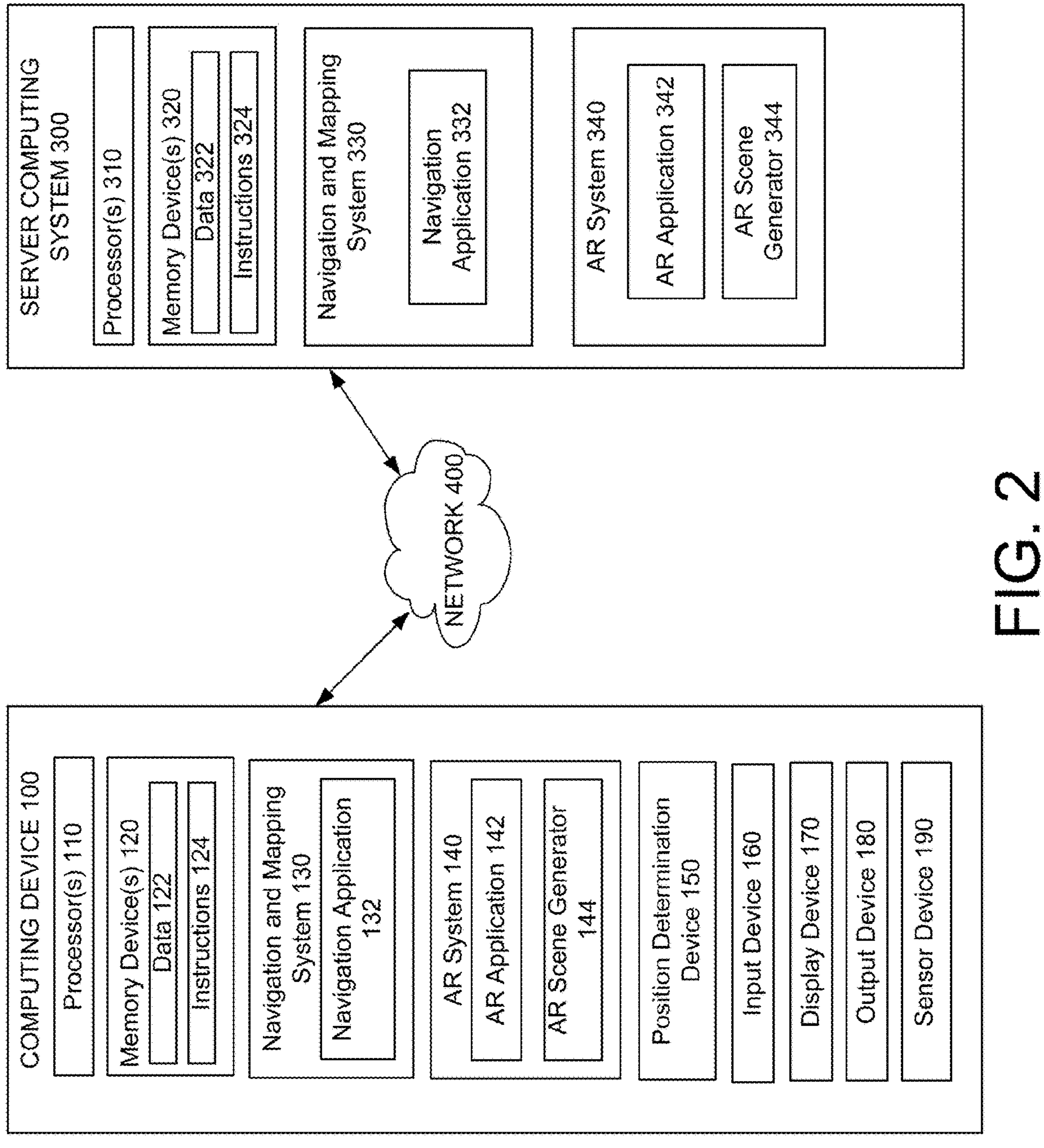
FIG. 2 depicts example block diagrams of a computing device and a server computing system according to one or more example embodiments of the disclosure.

Referring now to FIG. 2, example block diagrams of a computing device and server computing system according to one or more example embodiments of the disclosure will now be described. Although computing device 100 is represented in FIG. 2, features of the computing device 100 described herein are also applicable to the external computing device 200.

The computing device 100 may include one or more processors 110, one or more memory devices 120, a navigation and mapping system 130, an augmented reality (AR) system 140, a position determination device 150, an input device 160, a display device 170, an output device 180, and a sensor device 190. The server computing system 300 may include one or more processors 310, one or more memory devices 320, a navigation and mapping system 330, and an AR system 340.

For example, the one or more processors 110, 310 can be any suitable processing device that can be included in a computing device 100 or server computing system 300. For example, the one or more processors 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The one or more memory devices 120, 320 can include one or more non-transitory computer-readable storage mediums, including a Read Only Memory (ROM), Programmable Read Only Memory (PROM), Erasable Programmable Read Only Memory (EPROM), and flash memory, a USB drive, a volatile memory device including a Random Access Memory (RAM), a hard disk, floppy disks, a blue-ray disk, or optical media such as CD ROM discs and DVDs, and combinations thereof. However, examples of the one or more memory devices 120, 320 are not limited to the above description, and the one or more memory devices 120, 320 may be realized by other various devices and structures as would be understood by those skilled in the art.

For example, the one or more memory devices 120 can store instructions, that when executed, cause the one or more processors 110 to execute the augmented reality (AR) application 142, and to execute the instructions to perform operations associated with the AR application 142 as described according to examples of the disclosure.

One or more memory devices 120 can also include data 122 and instructions 124 that can be retrieved, manipulated, created, or stored by the one or more processors 110. In some example embodiments, such data can be accessed and used as input to implement the AR application 142, and to execute the instructions to perform operations associated with the AR application 142 as described according to examples of the disclosure.

In some example embodiments, the computing device 100 includes a navigation and mapping system 130. For example, the navigation and mapping system 130 may include a navigation application 132. According to examples of the disclosure, the navigation application 132 may be executed by the computing device 100 to provide a user of the computing device 100 a way to navigate to a location. The navigation application 132 can provide navigation services to a user. In some examples, the navigation application 132 can facilitate a user's access to a server computing system 300 that provides navigation services. In some example embodiments, the navigation services include providing directions to a specific location such as a POI. For example, a user can input a destination location (e.g., an address or a name of a POI). In response, the navigation application 132 can, using locally stored map data for a specific geographic area and/or map data provided via the server computing system 300, provide navigation information allowing the user to navigate to the destination location. For example, the navigation information can include turn-by-turn directions from a current location (or a provided origin point or departure location) to the destination location. For example, the navigation information can include a travel time (e.g., estimated or predicted travel time) from a current location (or a provided origin point or departure location) to the destination location.

The navigation application 132 can provide, via a display device 170 of the computing device 100, a visual depiction of a geographic area. The visual depiction of the geographic area may include one or more streets, one or more points of interest (including buildings, landmarks, and so on), and a highlighted depiction of a planned route. In some examples, the navigation application 132 can also provide location-based search options to identify one or more searchable points of interest within a given geographic area. In some examples, the navigation application 132 can include a local copy of the relevant map data. In other examples, the navigation application 132 may access information at server computing system 300 which may be remotely located, to provide the requested navigation services.

In some examples, the navigation application 132 can be a dedicated application specifically designed to provide navigation services. In other examples, the navigation application 132 can be a general application (e.g., a web browser) and can provide access to a variety of different services including a navigation service via the network 400.

In some examples, the navigation application 132 can be implemented in association with AR system 140 and AR application 142. For example, the navigation application 132 may provide navigation directions to a location by presenting navigation information via display device 170, where such navigation information may include virtual objects which are overlaid on real-world objects in an AR view presented on the display device 170 (e.g., via AR system 140 and AR application 142).

In some example embodiments, the computing device 100 includes the AR system 140. For example, the AR system 140 may include an AR application 142 and AR scene generator 144. According to examples of the disclosure, the AR application 142 may be executed by the computing device 100 to provide a user of the computing device 100 an AR view, for example, via display device 170. Aspects of the AR application 142 are further described herein. AR scene generator 144 may generate or render images (e.g., virtual objects) which are presented on the display device 170, for example, as virtual objects. As described herein, virtual objects (e.g., an outline of a building) may be generated according to geographic coordinate data information associated with real-world objects that are proximate to a location of the computing device 100.

In some example embodiments, the computing device 100 includes a position determination device 150. Position determination device 150 can determine a current geographic location of the computing device 100 and communicate such geographic location to server computing system 300 over network 400. The position determination device 150 can be any device or circuitry for analyzing the position of the computing device 100. For example, the position determination device 150 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining a position of the computing device 100.

The computing device 100 may include an input device 160 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or speech recognition sensor (e.g., a microphone to receive a voice input such as a voice command or a voice query), an output sound device (e.g., a speaker), a track ball, a remote controller, a portable (e.g., a cellular or smart) phone, a tablet PC, a pedal or footswitch, a virtual-reality device, and so on. The input device 160 may further include a haptic device to provide haptic feedback to a user. The input device 160 may also be embodied by a touch-sensitive display having a touchscreen capability, for example. For example, the input device 160 may be configured to receive an input from a user associated with the input device 160.

The computing device 100 may include a display device 170 which displays information viewable by the user (e.g., a map, an augmented view of a location, a user interface screen, etc.). For example, the display device 170 may be a non-touch sensitive display or a touch-sensitive display. The display device 170 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays. The display device 170 can be used by the navigation and mapping system 130 installed on the computing device 100 to display information to a user relating to an input (e.g., information relating to a location of interest to the user, a user interface screen having user interface elements which are selectable by the user, etc.). Navigational information can include, but is not limited to, one or more of a map of a geographic area, an augmented view of a location (e.g., a three-dimensional augmented view of a location, etc.), the position of the computing device 100 in the geographic area, a route through the geographic area designated on the map, one or more navigational directions (e.g., turn-by-turn directions through the geographic area), travel time for the route through the geographic area (e.g., from the position of the computing device 100 to a POI), and one or more points-of-interest within the geographic area. The display device 170 can be used by the AR system 140 installed on the computing device 100 independent of the navigation and mapping system 130 or navigation application 132 to display an augmented view to the user. For example, the augmented view may be presented on the display device 170 to combine real world and computer-generated content, for example, regarding a surrounding environment associated with the location of the computing device 100. For example, the computer-generated content may include virtual objects which are generated independent of the location or in association with the location. For example, the computer-generated content may be a message, a symbol, or other image which is unrelated to the surrounding environment or location of the computing device 100. For example, the computer-generated content may be a message, a symbol, or other image which is related to the surrounding environment or location of the computing device 100. For example, the message or symbol may provide information about a POI. For example, the computer-generated content may include a virtual object which corresponds to an outline of a building or other real-world object that is within a field of view of the user, where the outline is generated based on geographic coordinate data associated with the real-world object.

The computing device 100 may include an output device 180 to provide an output to the user and may include, for example, one or more of an audio device (e.g., one or more speakers), a haptic device to provide haptic feedback to a user (e.g., a vibration device), a light source (e.g., one or more light sources such as LEDs which provide visual feedback to a user), a thermal feedback system, and the like. According to various examples of the disclosure, the output device 180 may include a speaker which outputs sound which is associated with a location in response to a user requesting an augmented view of a location.

The computing device 100 may include a sensor device 190. The sensor device 190 may include, for example, a camera or an imaging sensor (e.g., a complementary metal-oxide-semiconductor (CMOS) or charge-coupled device (CCD)) to capture images of a surrounding environment of the computing device 100 or to detect or recognize a user's behavior, figure, expression, or the number of joint users, etc. The sensor device 190 may further include a brightness sensor to detect and recognize brightness information or an ambient light sensor to detect and recognize an amount of ambient light in a surrounding environment. The sensor device 190 may also include an accelerometer, an encoder, a gyroscope, and the like, to detect or recognize the motion of a user or of an input device (e.g., a remote control), to receive a user's command. The sensor device 190 may also include one or more sensors to detect or recognize environmental information (for example, a temperature sensor to detect or recognize temperature, a pressure sensor to detect or recognize pressure, a humidity sensor to detect or recognize humidity, etc.). The sensor device 190 may also include a force and/or torque sensor to detect or recognize a force and/or torque. The sensor device 190 may further include an audio sensor (e.g., a microphone) to recognize a voice of one or more users. The sensor device 190 may further include a clock for obtaining time information. The sensor device 190 may further include a touch sensor to detect or recognize a touch input. The sensor device 190 may also include a fingerprint recognition sensor, an iris recognition sensor, a depth sensor, a LiDAR, a distance sensor, etc. However, the disclosure is not limited to these examples and may include other types of sensors.

In accordance with example embodiments described herein, the server computing system 300 can include one or more processors 310 and one or more memory devices 320 which were previously discussed above. The server computing system 300 may also include a navigation and mapping system 330 and an AR system 340.

For example, the navigation and mapping system 330 may include a navigation application 332 which performs functions similar to those discussed above with respect to navigation application 132. For example, the AR system 340 may include an AR application 342 which performs functions similar to those discussed above with respect to AR application 142. For example, the AR system 340 may include an AR scene generator 344 which performs functions similar to those discussed above with respect to AR scene generator 144.

Figure 3:
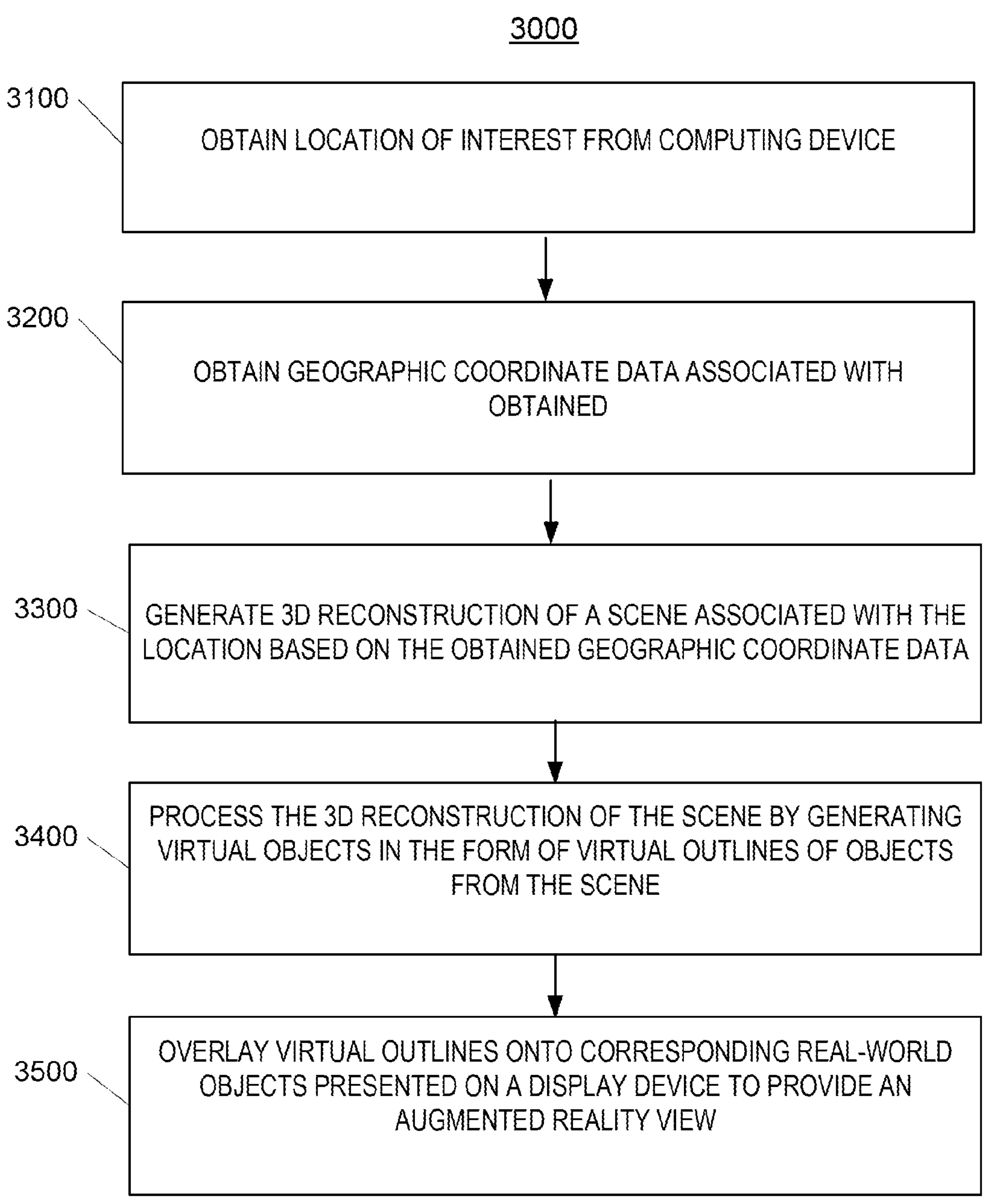
FIG. 3 illustrates a flow diagram of an example, non-limiting computer-implemented method, according to one or more example embodiments of the disclosure.

Examples of the disclosure are also directed to computer implemented methods for integrating media content with a three-dimensional scene. FIG. 3 illustrates a flow diagram of an example, non-limiting computer-implemented method, according to one or more example embodiments of the disclosure.

Referring to FIG. 3, in an example computer implemented method 3000 at operation 3100 the method includes obtaining a location of interest from computing device 100. For example, the location of interest may be a current location of the computing device 100 or an anticipated location of the computing device 100. The location of interest may be obtained by server computing system 300 or by computing device 100.

At operation 3200 the method includes obtaining geographic coordinate data associated with the obtained location. For example, the computing device 100 may request geographic coordinate data from server computing system 300 that is associated with the obtained location. For example, the server computing system 300 may obtain geographic coordinate data from that is associated with the obtained location in response to receiving the request from the computing device 100.

At operation 3300 the method includes generating a 3D reconstruction of a scene associated with the location based on the obtained geographic coordinate data. For example, either computing device 100 or server computing system 300 may be configured to generate the 3D reconstruction of the scene using the geographic coordinate data. In some implementations, the 3D reconstruction of the scene may encompass an area within a predetermined radius of the computing device 100 or of the location of interest. In some implementations, the 3D reconstruction of the scene may encompass an area within a predetermined distance of the computing device 100 or of the location of interest (e.g., in a particular direction from the computing device 100). In some implementations, the 3D reconstruction of the scene may include 3D reconstructions of all objects within the scene or of specified objects in the scene. The 3D reconstruction of the scene may be obtained from captured images of the scene (e.g., from scene imagery 384) and based on geographic coordinate data associated with the location and associated with objects at the location (e.g., from coordinate data 382). For example, the 3D reconstruction of the scene may be stored at the server computing system 300 or associated data stores (e.g., POI data store 370, reconstruction data 386, etc.).

At operation 3400 the method includes processing the 3D reconstruction of the scene by generating virtual objects in the form of virtual outlines of objects from the scene. For example, either computing device 100 or server computing system 300 may be configured to process the 3D reconstruction of the scene so as to generate virtual objects in the form of virtual outlines of objects from the scene. For example, the virtual outlines of the objects may be formed by at least connecting some of the edges of the objects in the 3D reconstruction of the scene and/or with knowledge of vertices of the objects, as applicable. The objects may include buildings, roads, sidewalks, landmarks, and the like.

At operation 3500 the method includes overlaying the virtual outlines onto corresponding real-world objects presented on the display device 170 so as to provide an augmented reality view associated with the location. For example, the computing device 100 may be configured to present the virtual outlines overlaying the real-world objects on the display device 170 under certain conditions (e.g., in response to an ambient light level being less than a threshold ambient light level, in response to a visibility level being less than a threshold visibility level, according to a default or user specified setting, etc.).

Examples of the disclosure are also directed to user-facing aspects by which a user can request and view an augmented view of a location. For example, the augmented reality view described according to examples disclosed herein may be provided at night or when visibility at a location is less than a threshold level, so as to provide a view of the location which may assist a user of a computing device 100 by providing the augmented reality view to safely navigate the location.

Figure 4:
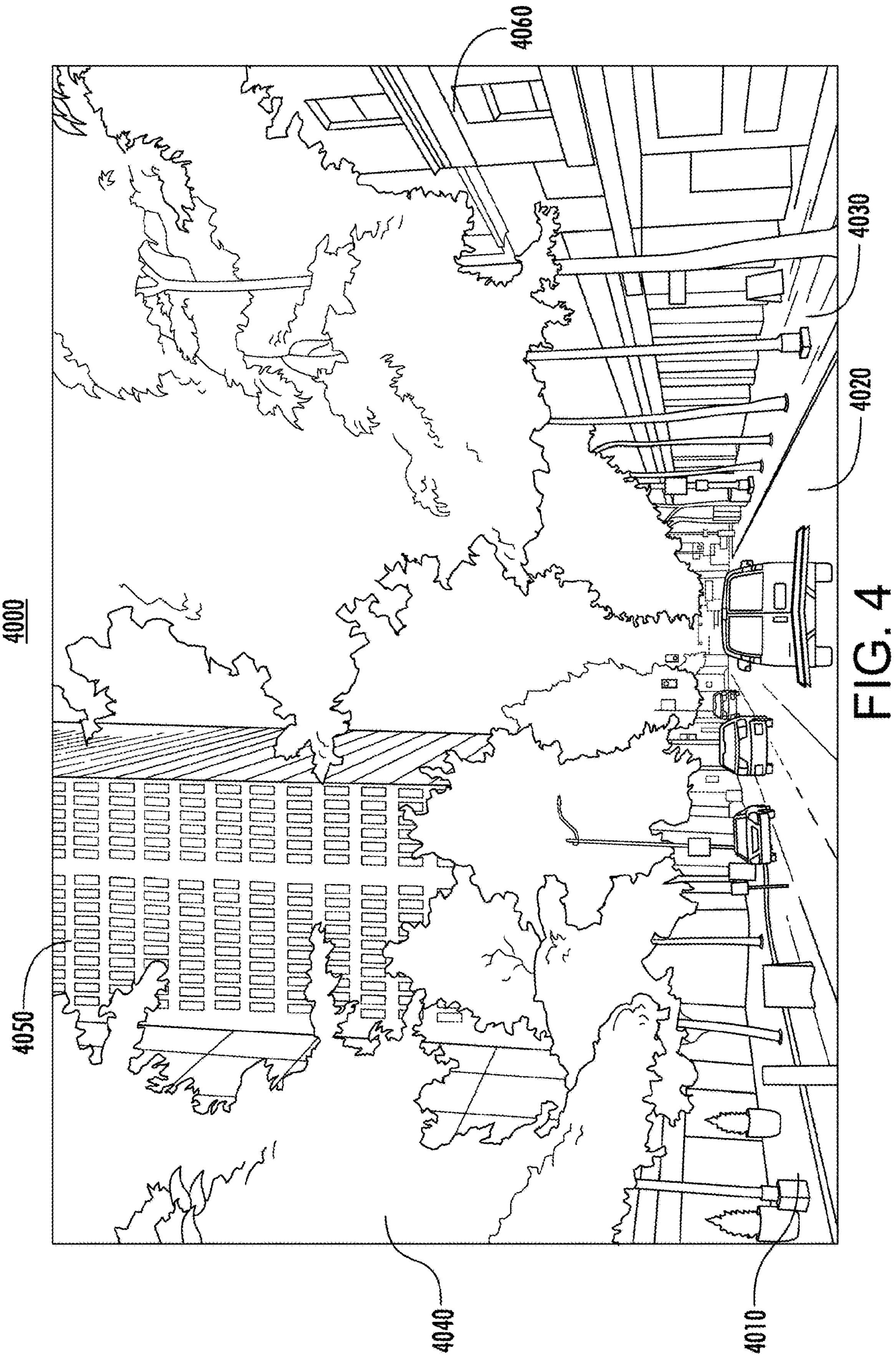
FIG. 4 illustrates a view or scene of a location, according to one or more example embodiments of the disclosure.
Figure 5:
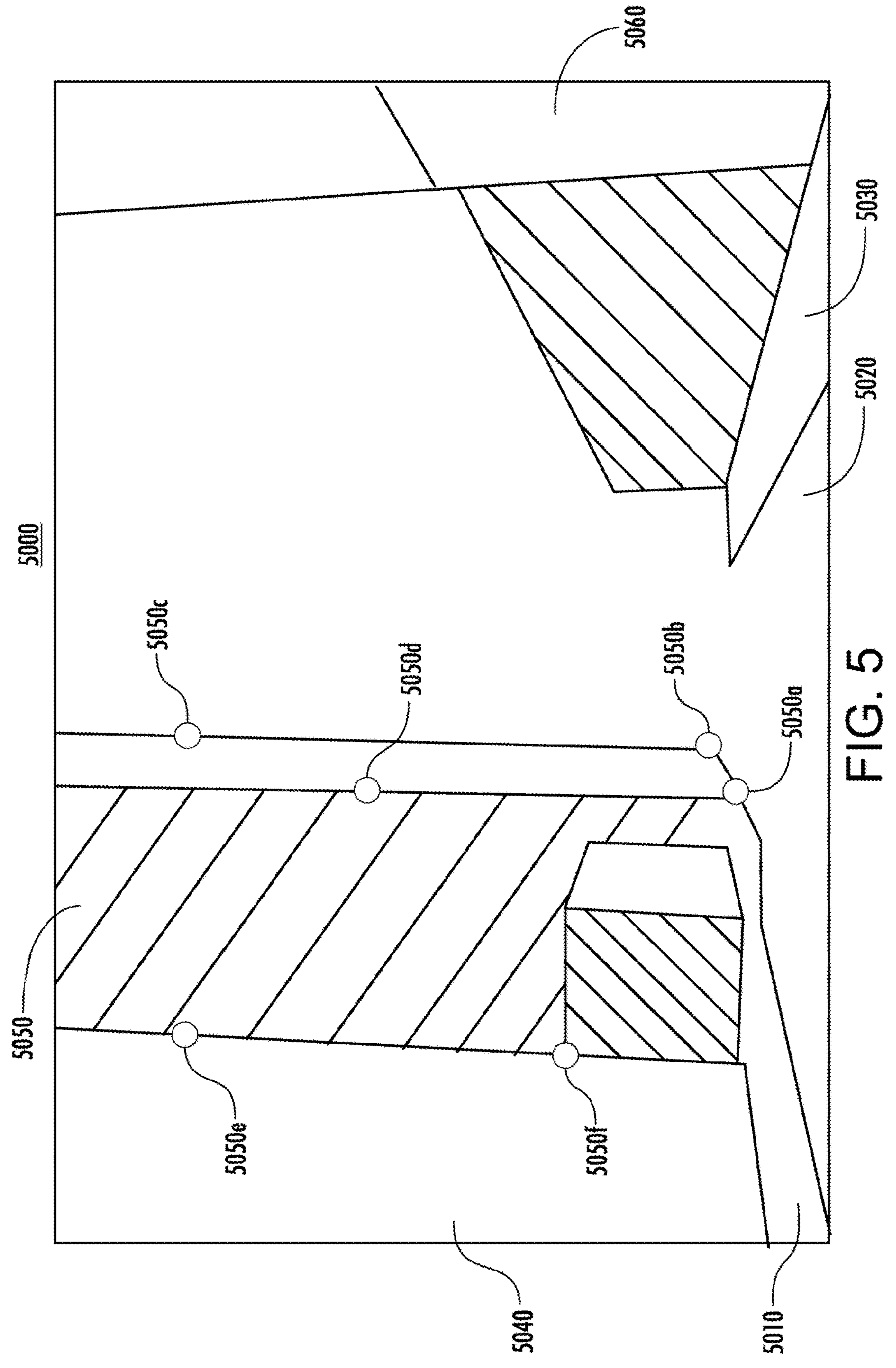
FIG. 5 illustrates an example reconstructed three-dimensional (3D) view or 3D scene of a location, according to one or more example embodiments of the disclosure.
Figure 6:
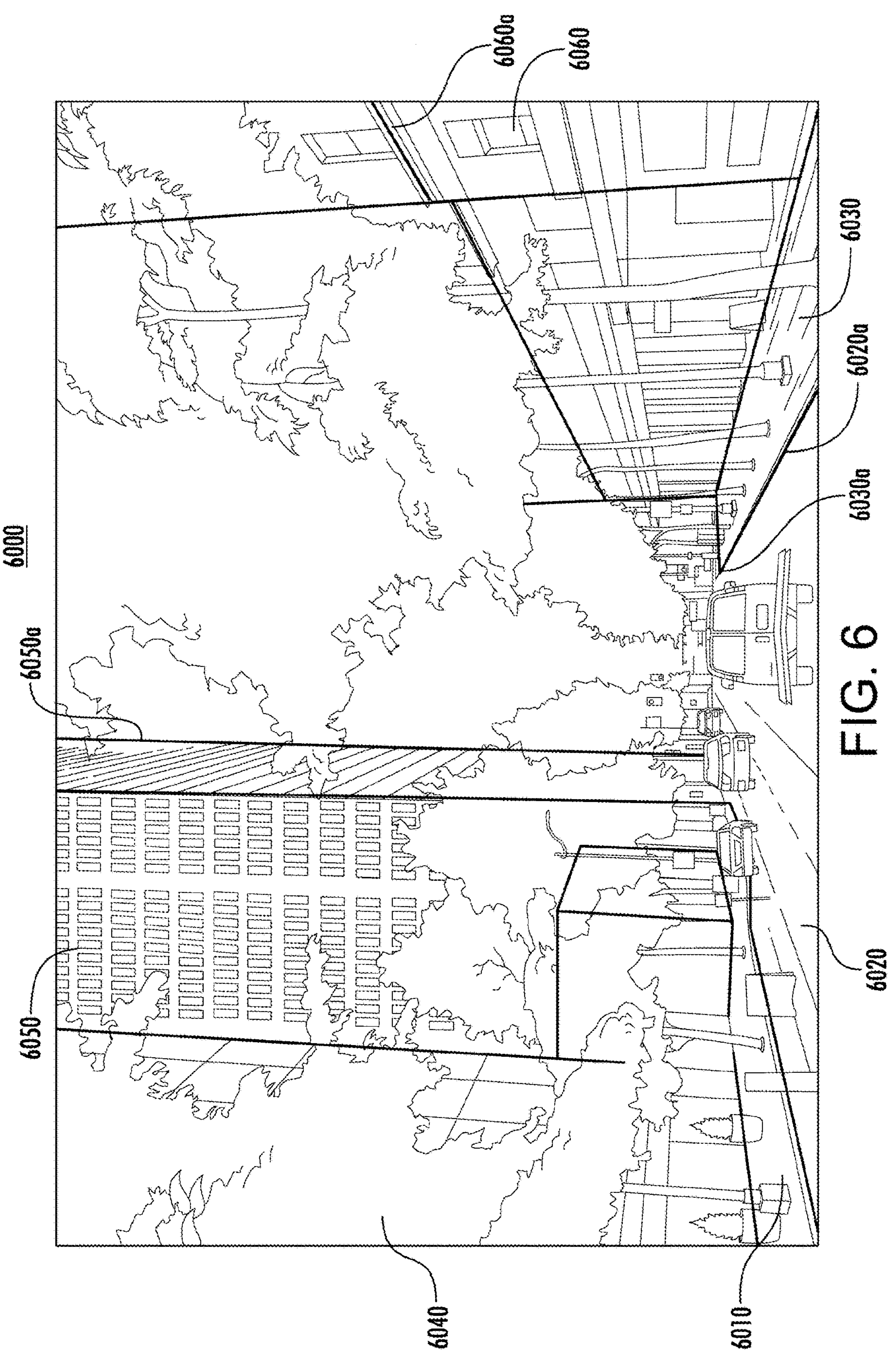
FIG. 6 illustrates an example reconstructed three-dimensional (3D) view or 3D scene of a location which is overlaid on a real-world view or scene that is presented on a display device, according to one or more example embodiments of the disclosure.

FIGS. 4 through 6 illustrate example augmented reality views that may be presented on display device 170, according to one or more example embodiments of the disclosure.

For example, FIG. 4 illustrates a view or scene 4000 of a location 4010 which includes features including a street 4020, a sidewalk 4030, and buildings 4040, 4050, 4060, according to one or more examples of the disclosure. The scene 4000 illustrated in FIG. 4 can be a real-world view which is presented on display device 170, for example, as a scene which is presented while a camera of the computing device 100 captures a surrounding environment while AR application 142 is being executed. The scene 4000 illustrated in FIG. 4 does not depict any virtual objects, however virtual objects such as text or symbols or icons describing features or other information about the street 4020, sidewalk 4030, and buildings 4040, 4050, 4060 could be presented by overlaying the text or symbols or icons on the real-world view of the location 4010 presented on the display device 170. For example, the real-world view can be captured by a camera or other sensor device (e.g., a LIDAR) and presented on the display device 170.

A position of the computing device 100 (and associated user) at the location 4010 may be determined by the position determination device 150. For example, computing device 100 may request a 3D reconstruction of scene 4000 from the server computing system 300 based on the determined position or location of the computing device 100. An orientation of the computing device 100 and/or display device 170 may also be provided for requesting the 3D reconstruction of the scene. The orientation of the computing device 100 and/or display device 170 may be obtained from the sensor device 190 (e.g., via a gyroscope). For example, the computing device 100 may provide its location to the server computing system 300, the server computing system 300 may determine the location of the computing device 100 itself, or the computing device 100 may request the 3D reconstruction of scene 4000 for a particular geographic location without specifically providing its current location. The server computing system 300 can generate (e.g., in real-time) the 3D reconstruction of the scene 4000 based on the location of the computing device 100 or the location requested by the computing device 100, according to geographic data (e.g., location data including longitude and latitude information) about objects at the location. For example, geographic data about the street 4020, sidewalk 4030, and buildings 4040, 4050, 4060 may be stored at server computing system 300 or data stores associated therewith (e.g., coordinate data 382, reconstruction data 386, POI data store 370, etc.). The geographic data may include coordinate information about particular features of the objects which can be used to construct a 3D model of the object in reconstructing the scene as a whole. For example, server computing system 300 may store coordinate information about one or more vertices of a building, about one or more points along an edge of a building, about one or more vertices of a sidewalk, about one or more points along an edge of a sidewalk, about one or more vertices of a street, about one or more points along an edge of a street, etc. The coordinate data may provide height, width, and length information about the object, for example. In some implementations, coordinate data for one or more objects may be inferred or interpolated when location information about the object is incomplete, for example, due to the object being obscured by other objects.

For example, FIG. 5 illustrates a reconstructed three-dimensional (3D) view or 3D scene 5000 of a location 5010 which corresponds to location 4010, according to one or more examples of the disclosure. The reconstructed 3D scene 5000 includes features including a street 5020, a sidewalk 5030, and buildings 5040, 5050, 5060, for example. The reconstructed 3D scene 5000 illustrated in FIG. 5 corresponds to the scene 4000 shown in FIG. 4, and can be generated based on geographic coordinates stored at server computing system 300 or an associated data store, for example. As shown in FIG. 5, coordinate data may include coordinates that are associated with one or more edges or one or more vertices of a building or one or more intersection points between objects in a scene. For example, regarding building 5050, points **5050*a* and 5050*b* may represent vertices of building 5050 and have corresponding coordinate data (e.g., latitude and longitude information) associated therewith. Points 5050*c*, 5050*d*, and 5050*e* may represent points along edges of building 5050 and have corresponding coordinate data (e.g., latitude and longitude information) associated therewith. Point 5050*f* may represent a point at which a portion of building 5050 intersects another building that is viewable in the reconstructed 3D scene 5000. Each of the objects in the reconstructed 3D scene 5000 may have coordinate data associated therewith which is stored at server computing system 300 or data stores associated therewith (e.g., coordinate data 382, reconstruction data 386, POI data store 370, etc.). For example, objects from the reconstructed 3D scene 5000** may be formed by a 3D mesh.

In some implementations, server computing system 300 may transmit the coordinate data associated with the objects disposed at the location and the computing device 100 may be configured to generate the reconstructed 3D model based on the coordinate data for one or more of the objects. In some implementations, server computing system 300 may transmit the reconstructed 3D model to the computing device 100 after generating the reconstructed 3D model based on the coordinate data.

The amount of coordinate data to be transmitted to the computing device 100 or a size of the scene to be generated may be determined according to a threshold value, for example. For example, coordinate data may be retrieved from server computing system 300 or data stores associated therewith for one or more objects within a predetermined radius of the computing device 100. In some implementations the predetermined radius of the computing device 100 may correspond to a field of view of a camera of the computing device 100. In some implementations the predetermined radius of the computing device 100 may be configured by a user of the computing device 100 or may be a default value. The predetermined radius can be a value greater than or outside the field of view of the camera such that virtual objects corresponding to objects from the reconstructed 3D scene can be viewed on the display device 170 even though the corresponding real-world objects would not be viewable by a user via the camera. For example, the reconstructed 3D model may be generated by server computing system 300 or computing device 100 based on coordinate data associated with one or more objects within a predetermined radius of the computing device 100. The objects to be used to reconstruct the 3D model of the scene may be selectable such that not all objects in the real-world scene are reconstructed in the 3D model. For example, a user may select to have the reconstructed 3D model depict buildings only, rather than the street and sidewalk objects. Therefore, computing resources may be conserved by rendering or obtaining coordinate data via a computing network for only some of the objects rather than all of the objects in the scene. In some implementations, the reconstructed 3D model may be generated by server computing system 300 or computing device 100 based on coordinate data associated with one or more objects within a current or anticipated travelling direction of the computing device 100. Therefore, computing resources may be conserved by rendering objects and/or obtaining coordinate data via a computing network in a particular direction rather than in an entire radius of a scene.

For example, FIG. 6 illustrates a reconstructed three-dimensional (3D) view or 3D scene of a location which is overlaid on a real-world view or scene (e.g., captured by a camera) that is presented on a display device, according to one or more examples of the disclosure. For example, the reconstructed 3D scene may be transformed to an outline of the objects rather than a 3D mesh as in FIG. 5, where the outline may be formed by edges of the objects which, when connected at least partially, provide an overall indication of the shape of the object. In FIG. 6, the augmented reality view or augmented reality scene 6000 includes features or objects including a street 6020, a sidewalk 6030, and buildings 6040, 6050, 6060, for example. An example outline of the reconstructed 3D scene from FIG. 5 is illustrated in FIG. 6 and includes edges including edge 6050*a* that forms part of building 6050, edge 6020*a* that frames part of the street 6020 and part of the sidewalk 6030, and edge 6060*a* which forms part of building 6060. In some implementations the reconstructed 3D scene may be rendered in a manner so that it is invisible when presented on the display device 170 except for those portions which form part of the virtual outlines of the objects.

The outline of the reconstructed 3D scene is overlaid on real-world objects which are presented on the display device 170. The outline is derived or generated from geographic coordinate data rather than from edge detection or other image processing algorithms generated by analyzing a captured image of a scene. For example, the outline may be overlaid on the real-world objects in a corresponding manner by using the geographic coordinate data associated with the objects from the reconstructed 3D scene with geographic coordinate data associated with the real-world objects. For example, a corner 6030*a* of the outline of the sidewalk 6030 may have a latitude and longitude and height information associated therewith. Based on the current location of the computing device 100 (which includes latitude and longitude and height information) and based on an orientation of the computing device 100 and/or of the display device 170, the virtual outlines can be presented on the display device 170 (e.g., by overlaying the virtual outlines on the real-world scene displayed on the display device 170.

As another example, information from an image being captured by a camera or other sensor device of the computing device 100 can be used for overlaying the virtual outlines on the corresponding real-world objects presented in the augmented reality scene that is presented on the display device 170. For example, a distance from a current position of the computing device 100 to another location in the scene can be determined in real-time based on time of flight information or other distance measuring methods so as to match coordinate data information between real-world objects in the scene with virtual objects including virtual outlines of objects that correspond to the real-world objects. For example, if a current location of the computing device 100 is (X, Y, Z) and a location of the corner 6030*a* is (X1, Y1, Z1), then the location of the corner of the virtual outline of the sidewalk can be projected onto the real-world objects presented on the display device 170 (e.g., by using the difference between each of the coordinates and determining the real-world location in the scene which is offset from the current location of the computing device 100 by the difference).

In some implementations, the computing device 100 may be configured to present the virtual outlines overlaying the real-world objects on the display device 170 under certain conditions. For example, the computing device 100 may be configured to present the virtual outlines overlaying the real-world objects on the display device 170 in response to an ambient light level being less than a threshold ambient light level. The virtual outlines may aid a user of the computing device 100 with understanding their surroundings and environment which may otherwise not be visible (e.g., in the dark). For example, the computing device 100 may be configured to present the virtual outlines overlaying the real-world objects on the display device 170 in response to a visibility level being less than a threshold visibility level (e.g., visibility being less than a specified distance such as 10 meters, 5 meters, etc.). The virtual outlines may aid a user of the computing device 100 with understanding their surroundings and environment which may otherwise not be visible (e.g., in smoky conditions, foggy conditions, rainy conditions, etc.). For example, the computing device 100 may be configured to present the virtual outlines overlaying the real-world objects on the display device 170 according to a default or user specified setting (e.g., at a specific time of day, in response to a user selecting an option to present the virtual outlines on the augmented reality view, etc.).

Figure 7:
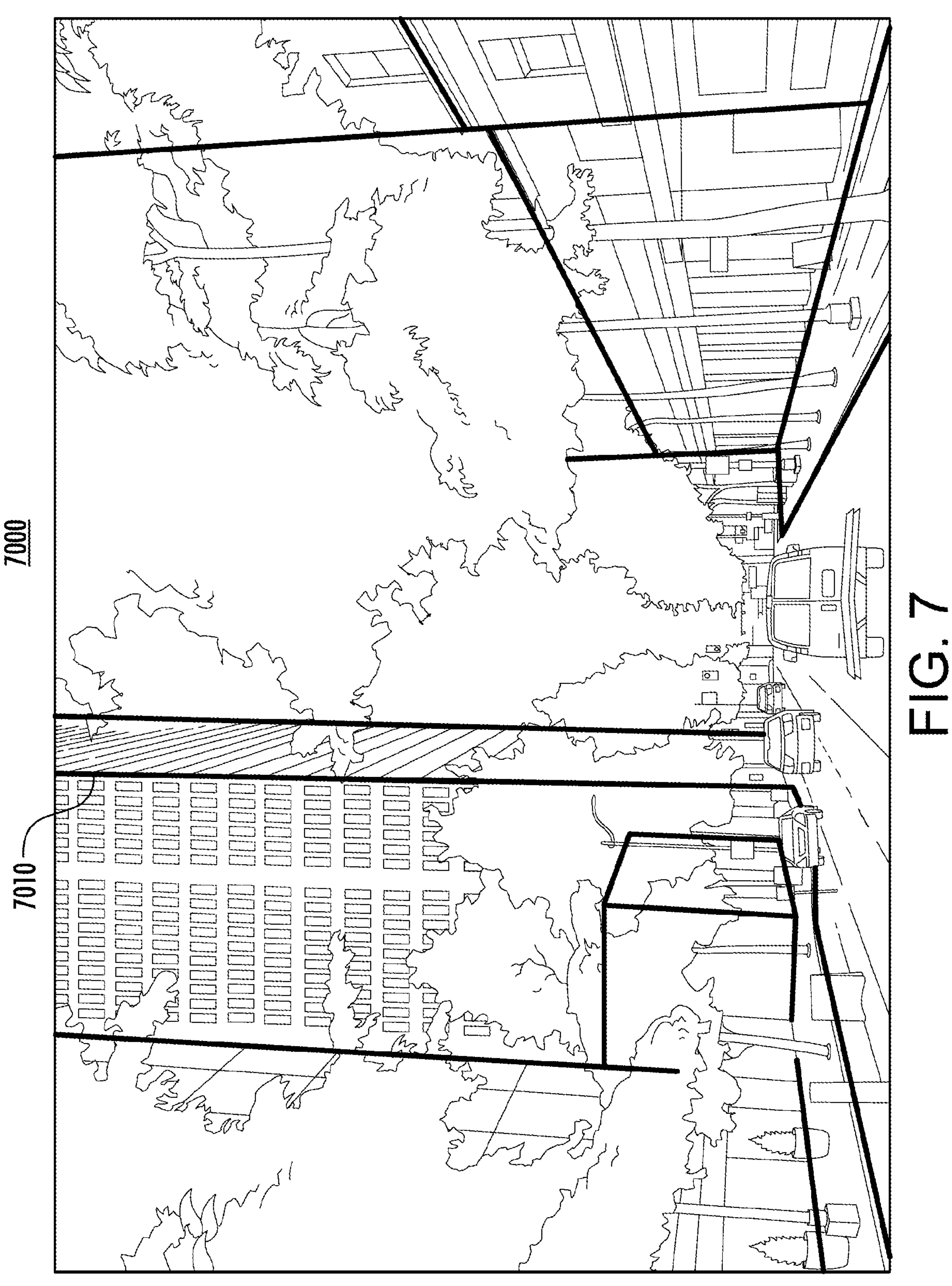
FIG. 7 illustrates another example reconstructed three-dimensional (3D) view or 3D scene of a location which is overlaid on a real-world view or scene that is presented on a display device, according to one or more example embodiments of the disclosure.

For example, FIG. 7 illustrates another reconstructed three-dimensional (3D) view or 3D scene of a location which is overlaid on a real-world view or scene (e.g., captured by a camera) that is presented on a display device, according to one or more examples of the disclosure. For example, the virtual outlines of the objects as shown in FIG. 6 may be enhanced by image processing methods to improve visibility of the virtual outlines. For example, a shader may be utilized to apply a visual effect to the virtual outlines, for example to illuminate the virtual outlines 7010 to provide the augmented reality view 7000 of FIG. 7. For example, the shader may be utilized to apply the visual effect to the virtual outlines by the computing device 100 in some implementations (e.g., by AR application 142 and/or AR scene generator 144). For example, the shader may be utilized to apply the visual effect to the virtual outlines by the server computing system 300 in some implementations (e.g., by AR application 342 and/or AR scene generator 344). Other image processing methods may be implemented instead of, or in addition to the utilization of the shader. For example, ray tracing, application of a bitmap, or other techniques may be implemented to enhance or illuminate the virtual objects including the virtual outlines.

To the extent terms including “module”, and “unit,” and the like may be used herein, these terms may refer to, but are not limited to, a software or hardware component or device, including a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, including software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, for example as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A computing device, comprising:

a display device;

at least one memory to store instructions; and at least one processor configured to execute the instructions to:

request, from a server computing system, geographic data associated with a location of the computing device, wherein the geographic data includes latitude and longitude information about real-world objects in a surrounding environment of the computing device, generate, based on the location of the computing device and the geographic data, a three-dimensional (3D) reconstruction of a scene associated with the location, the 3D reconstruction of the scene including one or more objects which represent the real-world objects in the surrounding environment of the computing device, process the 3D reconstruction of the scene by generating one or more virtual objects which respectively correspond to the one or more objects, each virtual object being in a form of a virtual outline of a corresponding object among the one or more objects, the virtual outline for each object among the one or more objects in the 3D reconstruction of the scene being formed by identifying at least one of: one or more edges of each object, one or more vertices of each object, or one or more contours of each object, and provide, for presentation on the display device of the computing device, an augmented reality view of the scene by overlaying at least one virtual outline onto a corresponding real-world object presented on the display device such that the at least one virtual outline at least partially frames the corresponding real-world object.

2. The computing device of claim 1, wherein the at least one processor is configured to process the 3D reconstruction of the scene by generating the one or more virtual objects by utilizing a shader to illuminate each of the one or more virtual objects.

3. The computing device of claim 1, wherein the at least one processor is configured to generate the 3D reconstruction of the scene by mapping geographic data for one or more real-world objects among the real-world objects in the surrounding environment to corresponding virtual objects.

4. The computing device of claim 1, further comprising:

an ambient light sensor configured to sense ambient light in a surrounding environment of the computing device, wherein the at least one processor is configured to execute the instructions to generate, based on the location of the computing device and the geographic data, the 3D reconstruction of the scene is based on the ambient light sensed by the ambient light sensor being less than a threshold level.

5. The computing device of claim 1, wherein the one or more objects from the scene are disposed within a predetermined distance from the location of the computing device, and the predetermined distance is adjustable by a user of the computing device to be outside a field of view of the computing device.

6. A method, comprising:

requesting, from a server computing system, geographic data associated with a location of a computing device, wherein the geographic data includes latitude and longitude information about real-world objects in a surrounding environment of the computing device, generating, based on the location of the computing device and the geographic data, a three-dimensional (3D) reconstruction of a scene associated with the location, the 3D reconstruction of the scene including one or more objects which represent the real-world objects in the surrounding environment of the computing device;

processing the 3D reconstruction of the scene by generating one or more virtual objects which respectively correspond to the one or more objects, each virtual object being in a form of a virtual outline of a corresponding object among the one or more objects, the virtual outline for each object among the one or more objects in the 3D reconstruction of the scene being formed by identifying at least one of: one or more edges of each object, one or more vertices of each object, or one or more contours of each object; and providing, for presentation on a display device of the computing device, an augmented reality view of the scene by overlaying at least one virtual outline onto a corresponding real-world object presented on the display device such that the at least one virtual outline at least partially frames the corresponding real-world object.

7. A server computing system, comprising:

at least one memory to store instructions; and at least one processor configured to execute the instructions to:

obtain geographic data associated with a location of a computing device, wherein the geographic data includes latitude and longitude information about real-world objects in a surrounding environment of the computing device, generate, based on the location of the computing device and the geographic data, a three-dimensional (3D) reconstruction of a scene associated with the location, the 3D reconstruction of the scene including one or more objects which represent the real-world objects in the surrounding environment of the computing device;

process the 3D reconstruction of the scene by generating one or more virtual objects which respectively correspond to the one or more objects, each virtual object being in a form of a virtual outline of a corresponding object among the one or more objects, the virtual outline for each object among the one or more objects in the 3D reconstruction of the scene being formed by identifying at least one of: one or more edges of each object, one or more vertices of each object, or one or more contours of each object; and provide, for presentation on a display device of the computing device, an augmented reality view of the scene by overlaying at least one virtual outline onto a corresponding real-world object presented on the display device such that the at least one virtual outline at least partially frames the corresponding real-world object.

8. A non-transitory computer readable medium storing instructions which, when executed by a processor, cause the processor to perform the method of claim 6.

9. The method of claim 6, wherein processing the 3D reconstruction of the scene by generating the one or more virtual objects comprises utilizing a shader to illuminate each of the one or more virtual objects.

10. The method of claim 6, wherein generating, based on the location of the computing device and the geographic data, the 3D reconstruction of the scene comprises mapping the geographic data for one or more real-world objects among the real-world objects in the surrounding environment to corresponding virtual objects.

11. The method of claim 6, further comprising:

sensing ambient light in a surrounding environment of the computing device, wherein generating, based on the location of the computing device and the geographic data, the 3D reconstruction of the scene is based on the ambient light sensed in the surrounding environment of the computing device being less than a threshold level.

12. The method of claim 6, wherein the one or more objects from the scene are disposed within a predetermined distance from the location of the computing device.

13. The method of claim 12, wherein the predetermined distance is adjustable by a user of the computing device.

14. The method of claim 12, wherein the predetermined distance from the location of the computing device is outside a field of view of the computing device.

15. The method of claim 6, wherein the one or more objects correspond to one or more buildings, each of the one or more virtual objects are in the form of the virtual outline of a corresponding building among the one or more buildings, and at least one virtual outline at least partially frames a corresponding real-world building when presented on the display device.

* * * * *